Patented Mar. 8, 1932

1,848,509

UNITED STATES PATENT OFFICE

KLAUS WEINAND, OF LEVERKUSEN, GERMANY, ASSIGNOR TO GENERAL ANILINE WORKS, INC., OF NEW YORK, N. Y., A CORPORATION OF DELAWARE

DYESTUFFS OF THE ANTHRAQUINONE SERIES

No Drawing. Application filed February 5, 1931, Serial No. 513,791, and in Germany February 8, 1930.

The present invention relates to a process of preparing acid wool dyestuffs of the anthraquinone series and to the new dyestuffs obtainable by said process.

In accordance with the invention valuable acid wool dyestuffs of the anthraquinone series are obtainable by heating an 1-amino-4-halogenanthraquinone-2-sulfonic acid in the presence of water, of a suitable acid binding agent and of a cuprous salt with a compound of the formula:—

wherein $x$ means hydrogen, halogen, alkyl or the sulfonic acid group. The reaction is performed by dissolving or distributing the 1-amino-4-halogenanthraquinone-2-sulfonic acid or a water soluble salt thereof in water, adding a small amount of a cuprous salt, such as cuprous bromide or chloride and an acid binding agent reacting weakly alkaline in aqueous solution, such as sodium-, potassium- or ammonium-bicarbonate, alkali metal or ammonium sulfites, etc. and heating the reaction mixture to a temperature not exceeding about 100° C., preferably to a temperature between about 75-95° C. In order to obtain good results, the presence of air (oxygen) should be avoided as far as possible and in accordance therewith I prefer to work in an atmosphere being inert to the ortho-aminophenol applied, such as nitrogen, carbon dioxide, hydrogen, etc. Likewise cupric salts and strongly alkaline reacting acid binding agents, as are often applied in condensation processes of halogenanthraquinones with aromatic amino compounds, such as sodium carbonate, sodium acetate etc. should be avoided in my process, since they tend to decompose the ortho-aminophenol component of the reaction mixture.

The new compounds thus obtainable, which most probably correspond in their free form to the general formula:—

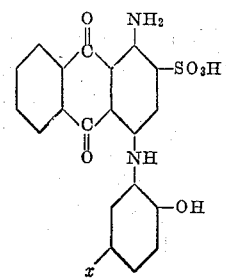

wherein $x$ means hydrogen, halogen, alkyl or the sulfonic acid group, form blue crystals being, in form of their alkali metal salts, easily soluble in water, dyeing wool from an acid bath blue shades, which turn to greenish-grey to black on afterchroming. The dyeings possess good fastness properties, especially to fulling and light.

The following examples illustrate the invention without restricting it thereto:—

*Example 1.*—10 parts by weight of 1-amino-4-bromoanthraquinone-2-sulfonic acid, 2.5 parts by weight of sodium bicarbonate, 2.5 parts by weight of sodium sulfite and 1 part by weight of cuprous bromide are stirred into 140 parts by weight of water. Thereupon 5 parts by weight of ortho-aminophenol are added and the mixture is heated to a temperature of 80-85° C. with the exclusion of air or, more advantageously, in a nitrogen atmosphere. After 4 to 5 hours, the reaction is finished and the sodium-1-amino-4.2'-hydroxyanilidoanthraquinone-2-sulfonate has separated in blue needles, which are filtered off and purified by recrystallizing from hot water.

The dyestuff thus obtained crystallizes in beautiful blue needles, soluble in water, and dyes wool from an acid bath blue shades changing on afterchroming to a greenish-grey or to a deep black corresponding to the strength of the dyeings. The dyeings show good fastness properties, especially to fulling and to light.

Similar dyestuffs are obtained when starting, instead of the ortho-aminophenol, with a 2-amino-4-alkyl- or 4-halogenphenol (-1), for instance, with 2-amino-4-methylphenol (-1) or 2-amino-4-chlorophenol (-1).

*Example 2.*—10 parts by weight of 1-amino-4-bromoanthraquinone-2-sulfonic acid, 5 parts by weight of sodium bicarbonate, 10 parts by weight of 2-aminophenol-4-sulfonic acid and 1 part by weight of cuprous chloride are stirred into 140 parts by weight of water and the reaction mixture is heated to a temperature of 80-85° C. while excluding air. After about 2 hours the condension product formed separates in blue needles. The working up is performed in accordance with Example 1.

The properties of the dyestuff thus obtained are similar to those of the dyestuffs described in Example 1.

I claim:—

1. Process which comprises reacting upon 1-amino-4-halogenanthraquinone-2-sulfonic acid at a temperature not exceeding about 100° C. with a compound of the probable formula:—

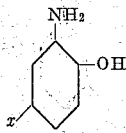

wherein $x$ means hydrogen, halogen, alkyl or the sulfonic acid group, in the presence of water, and acid binding agent reacting weakly alkaline in aqueous solution and in the presence of a small amount of a cuprous salt.

2. Process which comprises reacting upon an 1-amino-2-halogenanthraquinone-2-sulfonic acid at a temperature between about 75-95° C. with a compound of the probable formula:—

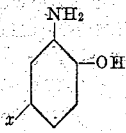

wherein $x$ means hydrogen, halogen, alkyl or the sulfonic acid group, in the presence of water, an acid binding agent reacting weakly alkaline in aqueous solution and in the presence of a small amount of a cuprous salt.

3. Process which comprises reacting upon an 1-amino-4-bromoanthraquinone-2-sulfonic acid at a temperature not exceeding about 100° C. with a compound of the probable formula:—

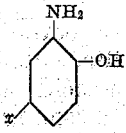

wherein $x$ means hydrogen, halogen, alkyl or the sulfonic acid group, in the presence of water, an acid binding agent reacting weakly alkaline in aqueous solution and in the presence of a small amount of a cuprous salt.

4. Process which comprises reacting upon an 1-amino-4-bromoanthraquinone-2-sulfonic acid at a temperature between about 75–95° C. with a compound of the probable formula:—

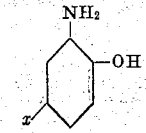

wherein $x$ means hydrogen, halogen, alkyl or the sulfonic acid group, in the presence of water, an acid binding agent reacting weakly alkaline in aqueous solution and in the presence of a small amount of a cuprous salt.

5. Process which comprises reacting upon 1-amino-4-bromoanthraquinone-2-sulfonic acid at a temperature not exceeding about 100° C. with a compound of the probable formula:—

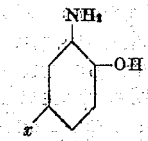

wherein $x$ means hydrogen or the sulfonic acid group, in the presence of water, an acid binding medium of the group consisting of alkali metal and ammonium bicarbonate, and of alkali metal and ammonium sulfites, and in the presence of a small amount of a cuprous salt.

6. Process which comprises reacting upon 1-amino-4-bromoanthraquinone-2-sulfonic acid at a temperature between about 75–95° C., with a compound of the probable formula:—

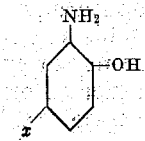

wherein $x$ means hydrogen or the sulfonic acid group, in the presence of water, an acid binding medium of the group consisting of alkali metal and ammonium bicarbonate, and of alkali metal and ammonium sulfites, and in the presence of a small amount of a compound of the formula Cu.hlg. wherein hlg. stands for chlorine or bromine.

7. The new compounds having in their free form the probable general formula:—

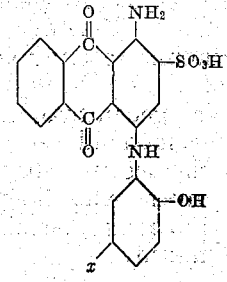

wherein $x$ means hydrogen, halogen, alkyl or the sulfonic acid group, said compounds forming blue crystals easily soluble in water in form of their alkali metal salts, dyeing wool from an acid bath blue shades, which on afterchroming turn to greenish-grey to black.

8. The new compound having in its free form the probable formula:—

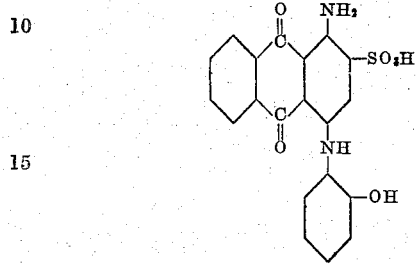

said compound forming blue crystals easily soluble in water in form of its alkali metal salts, dyeing wool from an acid bath blue shades, which on afterchroming turn to greenish-grey to black shades.

9. The new compound having in its free form the probable formula:—

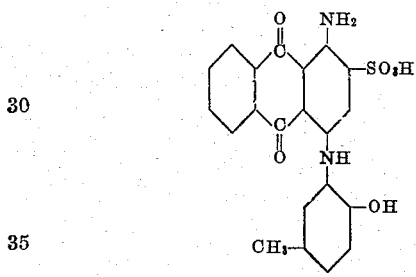

said compound forming blue crystals easily soluble in water in form of its alkali metal salts, dyeing wool from an acid bath blue shades, which on afterchroming turn to greenish-grey to black.

10. The new compound having in its free form the probable formula:

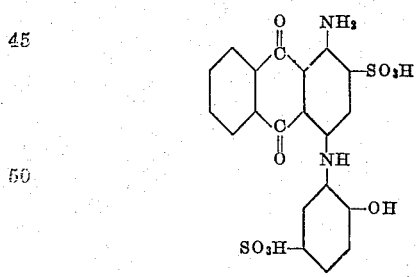

said compound forming blue crystals easily soluble in water in form of its alkali metal salts, dyeing wool from an acid bath blue shades, which on afterchroming turn to greenish-grey to black.

In testimony whereof, I affix my signature.

KLAUS WEINAND.